June 7, 1955 H. T. HUNTER 2,709,955
DOUGHNUT COOKING APPARATUS
Filed June 21, 1951
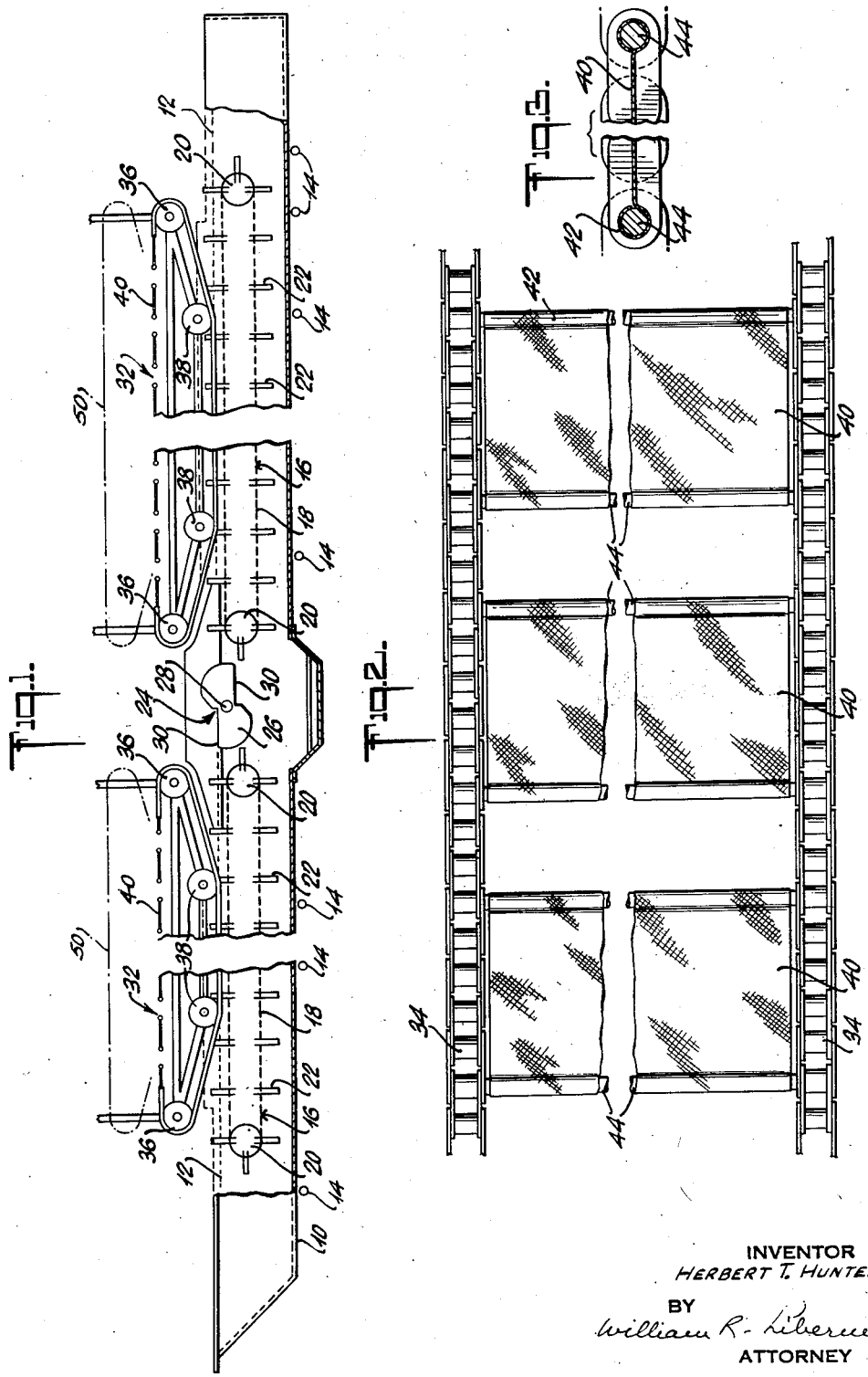
INVENTOR :
HERBERT T. HUNTER
BY
William R. Lieberman
ATTORNEY United States Patent Office 2,709,955
Patented June 7, 1955

2,709,955

DOUGHNUT COOKING APPARATUS

Herbert T. Hunter, Catonsville, Md., assignor to Doughnut Corporation of America, New York, N. Y., a corporation of New York Application June 21, 1951, Serial No. 232,789

8 Claims. (Cl. 99—404)

The present invention relates to improvements in dough cooking apparatus and it relates more particularly to an improved and novel apparatus for the cooking of doughnuts and similar dough products in a continuous fashion.

In the manufacture of cooked dough products such as doughnuts or the like, the shaped pieces of raw dough are dropped or otherwise deposited into an open tank of hot oil or fat for a time sufficient to adequately cook the dough. The dough pieces normally float in the hot oil and must be inverted in order to effect the cooking of both sides of the dough products. In the alternative, the dough pieces may be completely submerged during cooking, thereby obviating the flipping step. There have been machines proposed and employed for the continuous cooking of doughnuts which fall into both the above categories, but these machines possess many drawbacks. During the cooking of the pieces of dough, it is desirable, in order to achieve a high quality finished product, to subject the cooking pieces of dough to minimum of restraining and/or distorting forces. In the continuous dough cooking machines heretofore proposed or used, this requirement has not been satisfied. On the other hand, where the pieces of dough are advanced while floating in the hot oil and then flipped and further advanced, the resulting cooked product is characterized by an unsightly ring along the medial plane of the dough product. This ring is the result of the non-uniform cooking of the piece of dough along this plane, since it is subjected to considerably different cooking conditions than the rest of the piece of dough.

It is, therefore, a principal object of the present invention to provide an improved and novel apparatus for the cooking of pieces of dough, such as doughnuts or the like.

Another object of the present invention is to provide an improved and novel apparatus for the continuous cooking of pieces of dough, such as doughnuts or the like, in hot oil.

Still another object of the present invention is to provide a novel and improved apparatus for the continuous cooking of doughnuts or the like, in hot oil, which apparatus is simple, rugged and inexpensive.

A further object of the present invention is to provide a novel and improved apparatus for the continuous cooking of doughnuts, or the like, in hot oil, which apparatus produces a uniformly cooked product of excellent quality and attractive appearance.

The above and other objects of the present invention will become apparent from a reading of the following description taken in conjunction with the accompanying drawing, wherein Figure 1 is a front elevational view, partially broken away, of a preferred embodiment of the present invention;

Figure 2 is a partial detail plan view, showing a portion of the doughnut submerging mechanism; and Figure 3 is a front detail elevational view, illustrating a doughnut submerging member and its supporting conveyor.

The present invention broadly contemplates a dough cooking apparatus comprising a tank adapted to contain a hot cooking liquid, a plurality of longitudinally spaced transversely and vertically extending paddles intersecting the surface of said liquid, means for longitudinally advancing said paddles, submerging members disposed between successive paddles and movable therewith, and means for reciprocating said submerged members between positions below and above the surface of said liquid.

In accordance with a preferred embodiment of the present invention, there is provided a longitudinal trough containing a cooking liquid, and having means for heating said cooking liquid. Two aligned longitudinally separated pairs of transversely spaced endless conveyor chains are disposed in the trough and are driven at the same speed, and in the same direction. Radially extending paddles are supported between the chains so that they project above and below the surface of the cooking fluid, as they traverse their upper advancing run. A flipping mechanism coordinated with the advancing paddles is disposed between the confronting ends of the pairs of conveyor chains. Positioned above each pair of conveyor chains, is another pair of longitudinally extending transversely spaced conveyor chains having trapezoidal runs lying in vertical planes and having its lower shorter run lying below the level of the cooking liquid. The upper conveyor chains support between them longitudinally spaced flexible foraminous submerging members having lengths slightly less than the spacing between the paddles. The upper and lower pairs of chains are driven at the same speeds and in opposite directions, and are so phased that successive submerging members are brought into registry with the successive spaces between the advancing paddles. As each submerging member advances along its delivery sloping end run, it is brought into registry with a corresponding space between successive paddles and carried below the surface of the liquid. The submerging member advances with the paddles along its longitudinal run and below the surface of the cooking liquid and is then carried above the surface of the cooking liquid and out of registry with the corresponding paddle space, as it traverses the opposite discharging upwardly and outwardly sloping end run. Thus, pieces of dough deposited at the delivery end of the first set of paddles are received between the successive paddles, and as they are advanced by the paddles along the cooking liquid, they are urged below the level of the cooking liquid by the submerging members, advanced while so submerged, then released by the submerging members and discharged to the flipping mechanism. They are then inverted and fed to the next similar advancing mechanism where the cycle is repeated and the cooked dough is discharged and removed.

Referring now to the drawings, which illustrate a preferred embodiment of the present invention, which may be employed in the cooking of doughnuts, or the like, the numeral 10 generally designates an elongated tank or trough which contains a suitable cooking liquid, such as oil or the like, at a desired predetermined level 12. The width of the trough 10 is such as to permit the deposition of a plurality of raw doughnuts in a side by side relationship and the length of the trough such as to effect the complete cooking of the doughnuts as they are advanced along the length of the trough 10, in accordance with the rate of such advance. Thus, for a given cooking liquid temperature, the capacity of the apparatus is dependent upon the horizontal cross-sectional area of the tank 10. A set of gas burners 14, disposed below the tank 10, or any other suitable heating system, may be provided for raising and maintaining the cooking liquid at the desired temperature.

The mechanism for advancing the doughnuts through the cooking liquid and along the length of the tank 10, includes two transport devices 16, 16 which are disposed in spaced end to end relationship and extend together substantially the full length of the tank 10. Each of the transport devices 16 consists of a pair of transversely spaced endless conveyors 18, such as roller chains, or the like, which are disposed adjacent the side walls of the tank 10, and are mounted on and advanced by driven drums or sprocket wheels 20, 20, which, as viewed in Figure 1 of the drawing, are rotated in clockwise direction. Supported by and between the endless conveyors 18, and regularly spaced therealong, are paddle members 22, which are of substantially U-shaped cross-section, and extend transversely of the tank 10. The paddle members 22 are perpendicular to the conveyors 18, and lie in vertical planes as they are transported along their longitudinal runs by the conveyors 18. Furthermore, the paddles move from left to right as they traverse their upper forward run and extend above and below the surface 12 of the cooking liquid and are completely immersed in the liquid as they traverse their lower or return run.

A doughnut flipping mechanism 24 is disposed between the confronting ends of the transport devices 16, and includes an inverting member 26 extending transversely of the tank 10. The inverting member 26 is mounted on and rotatable with a transverse shaft 28 which is disposed at substantially the surface of the cooking liquid, the inverting member 26 having oppositely disposed substantially radially extending doughnut engaging surfaces 30, which are substantially horizontal when at the surface of the cooking liquid. The shaft 28 is so driven as to rotate the inverting member one half of a revolution, as the conveyors 18 advance a distance equal to the spacing between successive paddle members 22, 22 and the surface 30 is in a position to receive a set of floating doughnuts which are pushed toward it by the advancing paddle member 22.

A doughnut submerging mechanism 32 is disposed above each of the transport devices 16, 16 and includes a pair of transversely spaced endless conveyors, such as roller chains 34, each of which is supported upon vertically spaced pairs of sprocket wheels 36, 38, at least one of which is driven in a counter-clockwise direction. The longitudinal spacing of the upper sprocket wheels 36 is greater than the longitudinal spacing of the lower sprocket wheels 38, imparting a trapezoidal path to the roller chain 34. Furthermore, the lower longitudinal runs of the roller chains advance from left to right and are disposed below the level 12 of the cooking liquid. The chains 34 are driven at the same linear speed as the conveyors 16.

A plurality of longitudinally spaced transversely extending doughnut submerging members 40 are supported by and between the roller chains 34. The center to center spacing of the submerging members 40 is substantially equal to the center to center spacing of the paddle members 22, whereas their end to end spacing is substantially greater than the width of the paddles 22 to permit their being conveyed into and out of positions between the paddles 22 without interference therewith. The submerging members 40 are formed of a flexible foraminous material such as a woven wire screen which is provided with tubular end loops 42. The end loops 42 are engaged by mounting rods 44 which are supported by and between the roller chains 34, and maintain the material forming the submerging member in a taut condition. As the paddles 22 and the submerging members 40 are advanced, the submerging members are conveyed in a downwardly inclined path starting at a point in advance of the trailing end of the paddle path, and enter into registry with the spaces between the paddles and below the surface of the cooking liquid. They then advance in a horizontal path to the end of their longitudinal run and are then conveyed along the upwardly inclined end run out of the cooking liquid and out of registry with the spaces between the paddles 22. The sprocket wheels 36 and 38 are mounted on a suitable frame support for vertical movement en masse, so that the submerging mechanisms may be raised to the positions indicated by the broken lines 50, thereby permitting cooking of the doughnuts while in a floating condition.

In operation, a transverse line of raw doughnuts are periodically dropped into the feed end of the apparatus and directed forwardly by suitable mechanism (not shown) until engaged by an advancing paddle member 22, and advanced along the tank 10. As the doughnuts are so conveyed, they are urged below the surface of the cooking liquid by a registering submerging member 40, each line of doughnuts being substantially confined in a compartment defined by a pair of successive paddle members 22, and a registering interpositioned submerging member 40. It is thus apparent that the transported doughnuts are subjected to a minimum of distortion and abrasion. As the doughnuts approach the end of the first transport mechanism, the submerging members 40 are drawn upwardly and free of the paddles, and the floating doughnuts are discharged against and onto the doughnut engaging surface 30 of the flipper mechanism which inverts the doughnuts and discharges them to the feed end of the second transport mechanism. The doughnuts are again submerged, released and discharged to any suitable conveyor, not shown, which carries the cooked doughnuts from the tank 10 to subsequent processing.

While there has been described and illustrated a preferred embodiment of the present invention, it is apparent that numerous alterations and omissions may be made without departing from the spirit thereof.

I claim:

1. A cooking apparatus of the character described, comprising a tank for holding a cooking liquid, a plurality of longitudinally spaced transversely extending elements, means supporting said elements in positions extending below the surface of said liquid and adapted to advance said elements while so supported longitudinally through said tank, a plurality of longitudinally spaced submerging members and means supporting and advancing said submerging members between and along with said elements and moving said submerging members between positions above and below the surface of said cooking liquid as said submerging members are advanced with said elements.

2. A cooking apparatus of the character described, comprising a tank for holding a cooking liquid, a plurality of longitudinally spaced transversely extending elements, an endless conveyor having an upper forward run and supporting said elements during said forward run in positions extending below the surface of said liquid, a plurality of longitudinally spaced submerging members and means supporting and advancing said submerging members between and along with said elements and moving said submerging members between positions above and below the surface of said cooking liquid as said submerging members are advanced with said elements.

3. A cooking apparatus of the character described, comprising a tank for holding a cooking liquid, a plurality of longitudinally spaced transversely extending paddles, an endless driven conveyor having an upper forward run and supporting said paddles during said forward run in positions intersecting the surface of said liquid, a second endless conveyor disposed above said first conveyor and having a lower forward run and driven at substantially the same linear speed as said first conveyor, a plurality of longitudinally spaced submerging members supported by said second conveyor and registering with the spaces between the advancing paddles and positioned below the surface of said liquid while transported along the forward run by said second conveyor.

4. A cooking apparatus of the character described, comprising a tank for holding a cooking liquid, a plurality of longitudinally spaced transversely extending paddles, an endless driven conveyor having an upper forward run and supporting said paddles during said forward run in positions intersecting the surface of said liquid, a second endless conveyor disposed above said first conveyor and traversing a substantially trapezoidal path lying in a vertical plane and having horizontal parallel longitudinal runs and driven at substantially the same linear speed as said first conveyor and inclined end runs, the lower longitudinal run being shorter than the upper longitudinal run, said second conveyor advancing in a forward direction along said end runs and said lower run and a plurality of longitudinally spaced submerging members supported by said second conveyor and registering with the spaces between the advancing paddles and positioned below the surface of said liquid while transported along the forward run by said second conveyor.

5. A cooking apparatus of the character described, comprising a tank for holding a cooking liquid, a plurality of longitudinally spaced transversely extending elements, an endless driven conveyor having an upper forward run and supporting said elements during said forward run in positions extending below the surface of said liquid, a second endless conveyor disposed above said first conveyor and traversing a substantially trapezoidal path lying in a vertical plane and having horizontal parallel longitudinal runs and driven at substantially the same linear speed as said first conveyor and inclined end runs, the lower longitudinal run being shorter than the upper longitudinal run and being disposed below the surface of said cooking liquid, said second conveyor advancing in a forward direction along said end runs and said lower run and a plurality of longitudinally spaced submerging members supported by said second conveyor and registering with the spaces between the advancing elements while transported along the lower forward run by said second conveyor.

6. A cooking apparatus as claimed in claim 5, wherein submerging members are formed of a foraminous material.

7. A cooking apparatus as claimed in claim 6, wherein said second conveyor includes a pair of transversely spaced roller chains whose paths lie in parallel vertical planes and said submerging members are supported by and between said roller chains.

8. A cooking apparatus as claimed in claim 5, wherein said second conveyor includes a pair of transversely spaced roller chains whose paths lie in parallel vertical planes and said submerging members include spaced pairs of longitudinally separated rod members mounted on and between said roller chains, each of said pairs of rod members supporting therebetween a sheet of flexible foraminous material.

References Cited in the file of this patent

UNITED STATES PATENTS

| Number | Name | Date |
|---|---|---|
| 1,333,389 | Comb et al. | Mar. 9, 1920 |
| 1,598,435 | Gottschalk | Aug. 31, 1926 |
| 1,904,370 | Hunter | Apr. 18, 1933 |
| 1,904,885 | Seeley | Apr. 18, 1933 |
| 1,956,853 | Carpenter | May 1, 1934 |
| 2,042,655 | Ferry | June 2, 1936 |
| 2,463,112 | Kipnis | Mar. 1, 1949 |